UNITED STATES PATENT OFFICE.

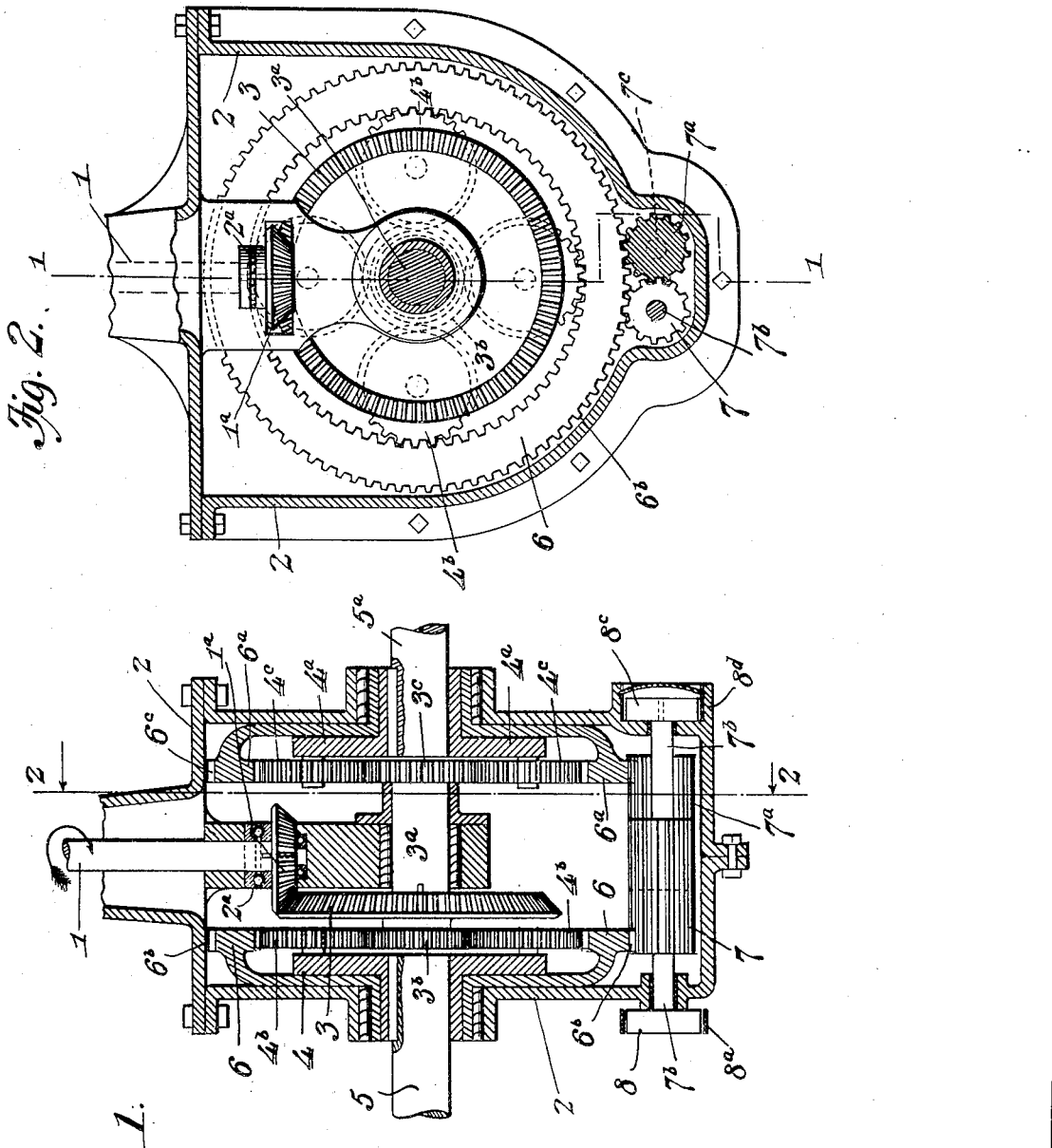

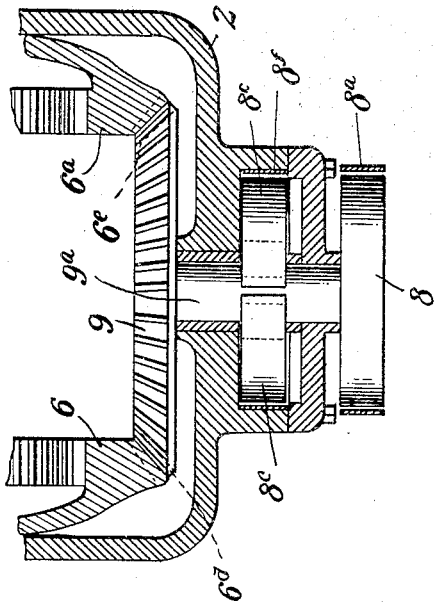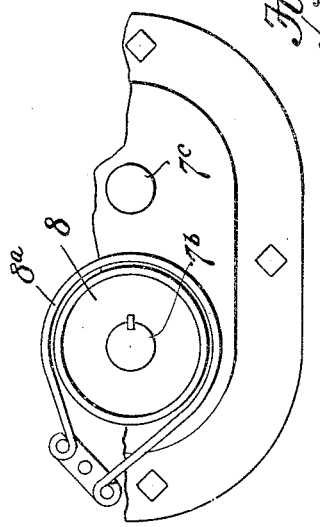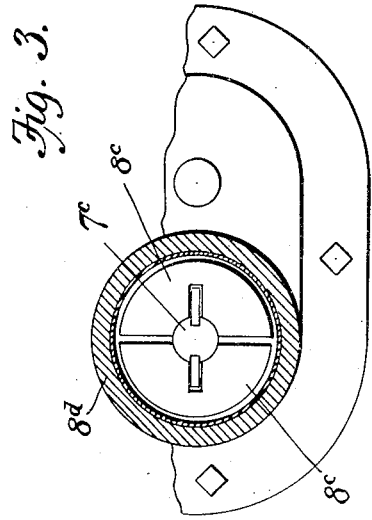

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

SPEED-REDUCING TRANSMISSION-GEARING.

1,358,788.   Specification of Letters Patent.   Patented Nov. 16, 1920.

Application filed March 26, 1920. Serial No. 369,134.

*To all whom it may concern:*

Be it known that I, DAVID E. Ross, a citizen of the United States, residing at La Fayette, in the county of Tippecanoe and State of Indiana, have invented certain new and useful Improvements in Speed-Reducing Transmission-Gearing; and I hereby declare that the following is a full, clear, and exact description thereof, reference being had to the accompanying drawings, which form part of this specification.

This invention is a novel improvement in speed reducing compensating gearing, and its object is to provide a simple, efficient, and powerful gearing in which a constantly fixed gear connection giving any desired speed reduction is obtained between the driving and the driven shafts, and in which the racing of one shaft relative to the other may be readily prevented; so that in case one shaft section should suddenly be relieved of resistance or duty such section may be kept from racing and the full power exerted on the other section until normal operative conditions are resumed.

I will explain one practical embodiment of the invention with reference to the accompanying drawings to enable others skilled in the art to understand and use the same and summarize in the claims the essentials of the invention and novel features of construction and novel combinations of parts for all of which I desire protection.

Figure 1 is a vertical sectional view (on line 1—1, Fig. 2) of a speed reducing torque augmenting transmission gearing embodying the invention, as adapted for use in propelling the driving axles of automobiles or like vehicles.

Fig. 2 is a section on the line 2—2, Fig. 1.

Fig. 3 is a detail view of one form of automatic frictional regulator.

Fig. 4 is a detail view of a manual control.

Fig. 5 is an enlarged detail sectional view of a slight modification of the automatic compensating mechanism and automatic controlling devices.

In the embodiment of the invention illustrated in the drawings the driving shaft 1 has its outer end mounted in a housing 2 of any suitable construction; and is journaled in bearings $2^a$ in this housing.

On the inner end of this driving shaft is a bevel pinion $1^a$, that meshes with a large bevel gear 3, which is mounted on a stub shaft $3^a$ suitably journaled in the housing 2 at right angles to the shaft 1. On the stub shaft $3^a$ is fixed a pinion $3^b$ at one side of the gear 3 and bearing $2^a$, and a pinion $3^c$ is keyed on said stub shaft at the opposite side of the bearing $2^a$.

The pinion $3^b$ meshes with a series of planetary gears $4^b$, which are suitably mounted on a spider or rotatable support 4 which may be splined or fixedly connected with the inner end of one of the driven shafts, or axle members, 5, which may be suitably journaled or supported in one side of the housing 2, as indicated in the drawing.

The gear $3^c$ meshes with a series of planetary gears $4^c$, mounted on a spider or support $4^a$, splined on or fixedly connected with the inner end of the opposite driven shaft or axle member, $5^a$; which is suitably journaled in the side of the housing 2. The shafts, or axle members, 5, and $5^a$, are in axial alinement.

The planetary gears $4^b$ also mesh with a surrounding annular internal gear 6, whose hub may be journaled in the housing 2. Similarly the planetary gears $4^c$ mesh with a surrounding annular internal gear $6^a$, the gear $6^a$ being suitably journaled in the housing 2. The gears 6, $6^a$ are normally held stationary within the housing. As shown each of these gears 6, $6^a$ is respectively provided with exterior peripheral teeth $6^b$, $6^c$, which respectively mesh with pinions 7 and $7^a$, the shafts of which are journaled in suitable bearings in the housing 2, and said pinions 7, $7^a$ are long enough to overlap and intermesh as indicated in Figs. 1 and 2, so that one annular gear 6 or $6^a$ can not be rotated without oppositely rotating the other gear $6^a$ or 6, as the motion imparted by the gears $3^b$, $3^c$ to the planetary gears $4^b$, $4^c$ is similar.

Under normal conditions the tendency of the planetary gears to cause the annular gears 6, $6^a$ to rotate with the planetary gears is overcome by the direct gearing 7, $7^a$ between the gears 6, 6ª, and the annular gears are therefore held stationary while the planetary gears are caused to take up an orbital movement in the direction of rotation of the pinions 3ᵇ, 3ᶜ at a rate of movement depending upon the ratios of the gears 1ª—3, 6, and 1ª—3, 6ª, the reduction in speed obtained in the transmission of power from the shaft 1 to shafts 5, 5ª under ordinary conditions depending upon the relative ratio of the gearing.

The shafts 5, 5ª are rotated once for each orbital movement of the planetary gears around the axes of the shafts 5, 5ª.

If, for example, in turning a corner, the shaft 5 should be connected with the inner wheel it would tend to slow up the movement of the planetary gears 4ᵇ, and consequently, as these are positively driven from the shaft 1, a rotary movement will be imparted to the annular gear 6, and this rotation of gear 6 will be transmitted to and move the related gear 6ª in the opposite direction, so that there will be a tendency to accelerate the orbital movement of the planetary gears 4c, and consequently of the shaft 5ª. As soon as the vehicle assumes a straight course the tendency to relative rotation of the members 6, 6ª is stopped because the strains thereon are equalized through the gearing and each shaft section 5, 5ª is driven at uniform speed.

If, for example, the wheel attached to shaft 5ª should drop into a mud-hole, or for other reasons lose its tractive effect, so that greater resistance would be offered by shaft 5 there would be an immediate tendency for the shaft 5 to slow up the orbital movement of the gears 4ᵇ and shaft 5 and to accelerate the rotation of the planetary gears 4ᶜ by the annular gear 6 taking up motion in one direction and such motion being imparted through the gearing to the annular gear 6ª, in the opposite direction thus accelerating the rotation of the shaft 5ª, while letting the shaft 5 slow up or come to rest.

To prevent such spinning action of either shaft 5, or 5ª, I provide means for manually or automatically checking relative rotations of the annular gears 6, 6ª under any abnormal conditions. For example, as shown in Fig. 1, shaft 7ᵇ of the gear 7 extends outside of the casing and is provided with a friction brake wheel 8 (Fig. 4) which is adapted to be engaged by a brake band 8ª, which may be connected to suitable operating means, not shown, but well known, so that if either shaft 5 or 5ª begins to spin for any reason, the operator can apply the brake and stop the relative rotation of the annular gears 6, 6ª and thus prevent the racing of either shaft and apply the full power of the engine to the tractive wheel to cause it to pull the machine out, until both wheels regain their normal tractive function.

Instead of a manual control, or in addition to a manual braking device, any suitable automatic friction brake may be used. As indicated in Figs. 1 and 3, the shaft 7ᵇ may carry gravital friction plates 8ᶜ, which are confined in a brake housing 8ᵈ attached to the side of the housing 2. Upon any undue relative rotation of the gears 6, 6ª the gears 7, 7ª would be rotated at high speed and the friction plates would be thrown outward by centrifugal force, and engage the frictional surface in the housing 8ᵈ and thus check the rotation of the gears and prevent racing of the sections 5, 5ª and bring the two gears 6, 6ª to rest, causing the power to properly drive both shaft sections 5, 5ª uniformly.

Instead of using the intermeshing gear pinions 7 and 7ª to control the relative rotation of the annular gears 6, 6ª these gears 6, 6ª might be provided with exterior beveled gear teeth, as indicated at 6ᵈ, 6ᵉ in Fig. 5, on their opposed faces which teeth mesh with opposite sides of an intermediate bevel gear 9, having a shaft 9ª journaled in a suitable bearing in the housing 2. On the shaft 9ª exterior to the housing may be secured the frictional brake shoes 8ᶜ within a housing 8ᶠ and on the end of this shaft 9 exterior to the frictional brake may be applied a hand brake 8, 8ª similar to that above described. The operation of the mechanisms and results obtained are the same in both constructions, and as above described.

What I claim is:

1. In combination, a driving shaft; opposite annular gears; planetary gears respectively meshing with the annular gears; connected pinions respectively meshing with the planetary gears to drive the latter; gearing for driving said pinions from the driving shaft; opposite axially alined driven members respectively connected with the opposite planetary gears so as to partake of the orbital movement of said planetary gears; and means to normally prevent relative rotation of the annular gears.

2. In transmission gearing, a driving shaft; opposite annular gears; sets of planetary gears respectively meshing with the annular gears; connected pinions respectively meshing with the sets of planetary gears to drive the latter; direct gearing for driving said pinions from the driving shaft; opposite axially alined shafts respectively connected with the opposite sets of planetary gears so as to partake of the orbital movement of said planetary gears; and gearing between said annular gears whereby they are normally held against relative rotation and when one is rotated the other is moved oppositely thereto.

3. In combination, a driving shaft; opposite driven members; opposite annular gears; planetary gears respectively connected with the opposite driven members and meshing with the annular gears; connected pinions respectively meshing with the planetary gears to drive the latter; direct gearing for driving said pinions from the driving shaft; and means whereby said annular gears are normally held against relative rotation and when one is rotated the other is moved oppositely thereto.

4. In transmission gearing, a driving shaft; opposite axially alined driven shafts; opposite annular gears; sets of planetary gears respectively connected with the opposite shafts and meshing with the annular gears; connected pinions respectively meshing with the planetary gears to drive the latter; direct gearing for driving said pinions from the driving shaft; direct gearing between the annular gears whereby said annular gears are normally held against relative rotation and when one is rotated the other is moved oppositely thereto.

5. In transmission gearing, a driving shaft; opposite annular gears; sets of planetary gears respectively meshing with the annular gears; connected pinions respectively meshing with the planetary gears to drive the latter; a bevel gear connected with said pinions; a bevel pinion on said driving shaft meshing with the said bevel gear; opposite driven members respectively connected with the opposite planetary gears so as to partake of the orbital movement of said planetary gears; and direct gearing between the annular gears whereby said annular gears are normally held against relative rotation and when one is rotated the other is moved oppositely thereto.

6. In combination, a driving shaft; opposite annular gears; planetary gears respectively meshing with the annular gears; connected pinions respectively meshing with the planetary gears to drive the latter; gearing for driving said pinions from the driving shaft; opposite axially alined driven members respectively connected with the opposite planetary gears so as to partake of the orbital movement of said planetary gears; and means to normally prevent relative rotation of the annular gears; with means to arrest relative rotation of the annular gears and prevent racing of one driven member relative to the other.

7. In transmission gearing, a driving shaft; opposite annular gears; sets of planetary gears respectively meshing with the annular gears; connected pinions respectively meshing with the sets of planetary gears to drive the latter; direct gearing for driving said pinions from the driving shaft; opposite axially alined shafts respectively connected with the opposite sets of planetary gears so as to partake of the orbital movement of said planetary gears; and gearing between whereby said annular gears are normally held against relative rotation and when one is rotated the other is moved oppositely thereto: with means to arrest relative rotation of the annular gears and prevent racing of one shaft relative to the other.

8. In combination, a driving shaft; opposite driven members; opposite annular gears; planetary gears respectively connected with the opposite driven members and meshing with the annular gears; connected pinions respectively meshing with the planetary gears to drive the latter; direct gearing for driving said pinions from the driving shaft; and means whereby said annular gears are normally held against relative rotation and when one is rotated the other is moved oppositely thereto; with means to arrest relative rotation of the annular gears and prevent racing of one driven member relative to the other.

9. In transmission gearing, a driving shaft; opposite axially alined driven shafts; opposite annular gears; sets of planetary gears respectively connected with the opposite shafts and meshing with the annular gears; connected pinions respectively meshing with the planetary gears to drive the latter; direct gearing for driving said pinions from the driving shaft; direct gearing between the annular gears whereby said annular gears are normally held against relative rotation and when one is rotated the other is moved oppositely thereto; with means to arrest relative rotation of the annular gears and prevent racing of one driven shaft relative to the other.

10. In transmission gearing, a driving shaft; opposite annular gears; sets of planetary gears respectively meshing with the annular gears; connected pinions respectively meshing with the planetary gears to drive the latter; a bevel gear connected with said pinions; a bevel pinion on said driving shaft meshing with the said bevel gear; opposite driven members respectively connected with the opposite planetary gears so as to partake of the orbital movement of said planetary gears; and direct gearing between the annular gears whereby said annular gears are normally held against relative rotation and when one is rotated the other is moved oppositely thereto; with means to arrest relative rotation of the annular gears and prevent racing of one driven shaft relative to the other.

11. In transmission gearing, a driving shaft; opposite axially alined driven shafts; opposite annular gears; sets of planetary gears respectively connected with the driven shafts and meshing with the annular gears; connected pinions respectively meshing with the planetary gears to drive the latter; a bevel gear connected with said pinion; a bevel pinion on said driving shaft meshing with the said bevel gear; and intermeshing pinions respectively meshing with the annular gears whereby said annular gears are normally held against relative rotation and when one is rotated the other is moved oppositely thereto; and means to arrest relative rotation of the annular gears and prevent racing of one shaft relative to the other.

In testimony that I claim the foregoing as my own, I affix my signature.

DAVID E. ROSS.